No. 701,520. Patented June 3, 1902.
F. L. SMITH & H. D. GIBBS.
TELESCOPE.
(Application filed Aug. 5, 1901.)
(No Model.)
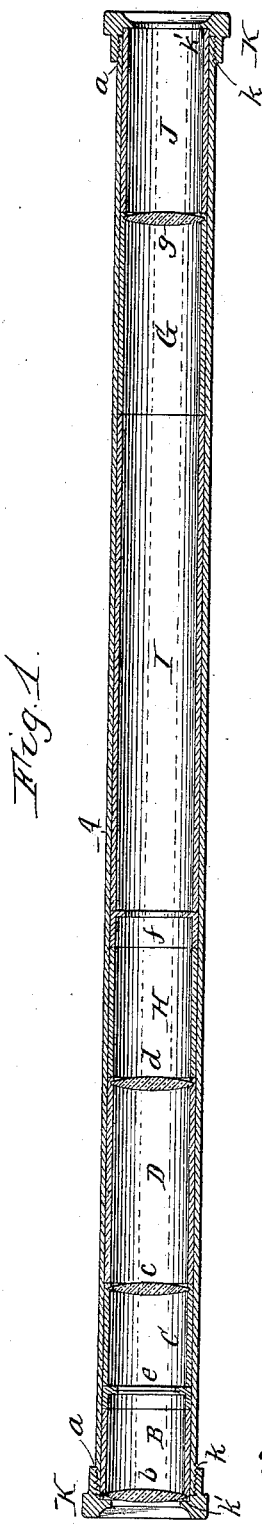
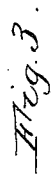
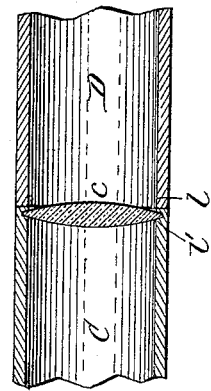
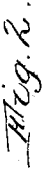
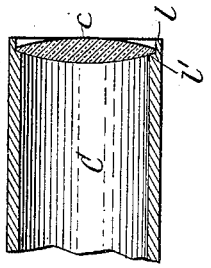
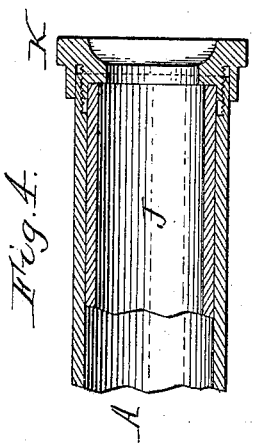
Witnesses:
Henry L. Deck
F. F. Scherzinger
Inventors:
Frederick L. Smith
Harry D. Gibbs
by Wilhelm Bonner
Attorneys

UNITED STATES PATENT OFFICE.

FREDERICK L. SMITH AND HARRY D. GIBBS, OF BUFFALO, NEW YORK, ASSIGNORS TO CATARACT TOOL AND OPTICAL COMPANY, OF BUFFALO, NEW YORK.

TELESCOPE.

SPECIFICATION forming part of Letters Patent No. 701,520, dated June 3, 1902.

Application filed August 5, 1901. Serial No. 70,854. (No model.)

*To all whom it may concern:*

Be it known that we, FREDERICK L. SMITH and HARRY D. GIBBS, citizens of the United States, and residents of Buffalo, in the county of Erie and State of New York, have invented new and useful Improvements in Telescopes, of which the following is a specification.

This invention relates to telescopes, and is herein described in connection with what are commonly known as "universal" telescopes; but it will be understood that the invention is also applicable to other forms of telescopes.

The object of the invention is to provide a simple, inexpensive, and desirable construction for holding the lenses, cross-hair diaphragms, and the like in the outer inclosing tube or casing and in which there are no openings in the inclosing tube which could admit water, light, dust, or the like and in which there are no securing devices or parts projecting from the inclosing tube which are liable in the rough handling of the instrument to be broken off or loosened.

A further object is to make the telescope of few parts, which can be quickly assembled and secured in proper relation in the inclosing tube and which can be easily taken apart for the purpose of cleaning or for other reason.

In the accompanying drawings, Figure 1 is a longitudinal sectional view of a universal telescope, disclosing the invention. Fig. 2 is an enlarged detail sectional view of one of the lens-cells. Fig. 3 is an enlarged detail sectional view of the adjacent portions of two cells. Fig. 4 is a detail sectional view of a modified construction of the end cap.

Like letters of reference refer to like parts in the several figures.

Referring to the drawings, A indicates the inclosing or outer tube, which, as shown, is cylindrical and preferably of the same internal diameter throughout its length. At its opposite ends the tube A is screw-threaded, preferably externally, as indicated at $a$.

Within the inclosing tube A at one end (the left-hand end in the drawings) is the eyepiece, which is shown as consisting of three lenses $b$, $c$, and $d$, the cross-hair diaphragm $e$, and the diaphragm $f$; but it will be understood that the number, character, and relative arrangement of these parts are not essential to the present invention and may be changed or varied to suit different uses or purposes for which the telescope may be intended. The lenses are mounted in any preferred manner respectively in lens-cells B, C, and D, which are shown to be short cylindrical tubes arranged end to end in the tube A and to be of an external diameter to fit nicely and slide in the bore of the tube.

$g$ indicates the objective lens, which is located in the opposite end of the inclosing tube A and is suitably mounted in a lens-cell G, which, like the other lens-cells, fits nicely in the inclosing tube A.

H, I, and J indicate spacing and securing shells, which are shown in the drawings to be located, respectively, between lens $d$ and the diaphragm $f$, between the diaphragm and the objective lens-cell G, and between the latter and the end of the tube A. The shells H, I, and J are lengths of tubing, preferably of the same external diameter as the lens-cells, so that they fit snugly in the inclosing tube and can be inserted therein and removed therefrom without difficulty, and their internal diameters are such as not to obstruct the light to the lenses or to render the instrument unnecessarily heavy.

The several lens-cells, shells, and diaphragms are arranged end to end in the tube A and are preferably of the same thickness of tubing and constitute, in effect, a sectional inner lens-tube.

K indicates end caps, one for each end of the tube A. The caps have securing-flanges provided, preferably internally, with screwthreads $k$, whereby the caps are adapted to be screwed onto the screw-threaded ends of the inclosing tube. The caps are also provided with shoulders $k'$, adapted to engage the ends of the tubular parts constituting the end sections of the inner sectional tube and force the latter inward when the caps are screwed onto the screw-threaded ends of the tube A. The combined length of the inner sectional tube, consisting of the lens-cells, diaphragms, and shells, is such that the outer ends of the end sections are engaged by the caps before the latter are screwed home on the outer tube A, thus enabling the inner tube-sections to be crowded or jammed together by means of the end caps, thereby tightly securing the several lens-cells, shells, and diaphragms in place. Preferably the combined length of the sectional inner tube is slightly greater than the length of the outer tube to facilitate this tight jamming of the sections; but it is obvious that this is not essential, for in such a construction as disclosed in Fig. 4 the engaging shoulders on the caps may be located sufficiently forward to engage a sectional tube terminating short of the ends of the outer tube. It will also be apparent from this Fig. 4 that it is not essential to the invention that the outer tube be externally and the caps internally screw-threaded, as the reverse arrangement (disclosed in said Fig. 4) will accomplish a like end.

Figs. 2 and 3 disclose the preferable manner of securing the lenses in the lens-cells. One end of each lens-cell is reduced internally, leaving a thin flange $l$, (see Fig. 2,) which surrounds the edge of the lens, and a shoulder $l'$, on which the lenses rest, the flange being turned in over the marginal portion of the lens, as shown in Fig. 3. The turned-in flange thus affords a metal rim against which the end of the adjacent cell or inner tube-section abuts and prevents injury to the lens.

The length of the individual lens-cells and shells and the relative arrangement of the same with the other parts may be considerably changed, the only requirement being that the combined length of the sectional inner tube is such that the end caps bear against the end sections and crowd the sections tightly together. The lens-cells are preferably short, so that when the same are removed from the inclosing tube the lenses can be easily wiped on both sides to clean the same, if found necessary.

We claim as our invention—

1. The combination with an inclosing tube, of a lens-tube therein made up of independent sections, means at one end of the inclosing tube against which one tube-section abuts, and a device at the other end of said inclosing tube adapted to jam the sections of said lens-tube tightly together, substantially as set forth.

2. The combination with an inclosing tube, of a lens-cell therein, one or more spacing-shells therein, said lens-cell and spacing shell or shells constituting a sectional inner tube, and end caps having screw-threaded engagements with the opposite ends of said inclosing tube and adapted to jam said lens-cell and shell or shells together between the end caps, substantially as set forth.

3. The combination with an inclosing tube, having screw-threaded ends, of a lens-cell at or near each end of said tube, a spacing-shell between said cells, said cells and shell constituting a sectional inner tube, and end caps having screw-threaded flanges engaging the screw-threaded ends of said inclosing tube and having shoulders engaging the ends of said inner sectional tube and adapted to jam the sections thereof tightly together, substantially as set forth.

Witness our hands this 14th day of June, 1901.

FRED. L. SMITH.
HARRY D. GIBBS.

Witnesses:
JNO. J. BONNER,
F. F. SCHERZINGS.